US005757550A

United States Patent [19]

Gulick, Jr.

[11] Patent Number: 5,757,550

[45] Date of Patent: May 26, 1998

[54] DUAL-VIEW IMAGING PRODUCT

[75] Inventor: Stephen Gulick, Jr., Rochester, N.Y.

[73] Assignee: Eastman Kodak Company, Rochester, N.Y.

[21] Appl. No.: 571,497

[22] Filed: Dec. 13, 1995

Related U.S. Application Data

[60] Provisional application No. 60/007,114 Oct. 31, 1995.

[51] Int. Cl.[6] ............................ G02B 27/10; G03B 21/60

[52] U.S. Cl. ............................ 359/619; 359/458

[58] Field of Search ............................ 359/619, 620, 359/621, 622, 623, 624, 625, 626, 458; 40/427, 454

[56] References Cited

U.S. PATENT DOCUMENTS

| | | | |
|---|---|---|---|
| 1,882,829 | 10/1932 | Hall | 359/458 |
| 3,268,238 | 8/1966 | Finkel | 283/63 |
| 3,538,632 | 11/1970 | Anderson | 40/106.51 |
| 3,830,556 | 8/1974 | Bratkowski | 359/456 |
| 4,033,059 | 7/1977 | Hutton | 40/137 |
| 4,140,370 | 2/1979 | Snaper | 359/458 |
| 4,870,768 | 10/1989 | Watt | 40/430 |
| 5,076,661 | 12/1991 | Bradley | 359/456 |
| 5,448,401 | 9/1995 | Takuma et al. | 359/456 |
| 5,483,254 | 1/1996 | Powell | 345/87 |
| 5,579,164 | 11/1996 | Chapnik | 359/618 |
| 5,615,045 | 3/1997 | Takuma et al. | 359/456 |

*Primary Examiner*—Georgia Y. Epps
*Assistant Examiner*—Ricky Mack
*Attorney, Agent, or Firm*—Gordon M. Stewart

[57] ABSTRACT

A dual-view imaging product, comprising:

a) an integral lens sheet;

b) at least two different integral images both aligned with the integral lens sheet, each having a normal viewing orientation, such that one is viewable in its normal orientation when the sheet is positioned horizontally with respect to the user's eyes, and the other is viewable in its normal orientation when the sheet is positioned vertically with respect to the user's eyes. The product allows simple and convenient viewing of a three-dimensional image as well as motion images on a single product.

16 Claims, 2 Drawing Sheets

DUAL-VIEW IMAGING PRODUCT

CROSS REFERENCE TO RELATED APPLICATION

Reference is made to and priority claimed from U.S. Provisional Application Ser. No. U.S. 60/007,114, filed 31 Oct. 1995, entitled DUAL-VIEW IMAGING PRODUCT, abandoned.

FIELD OF THE INVENTION

The present invention relates to an imaging product which can provide, in one orientation, a view of a three-dimensional image, and in another orientation a view of at least one two-dimensional image different from the three-dimensional image.

BACKGROUND OF THE INVENTION

Image products which use a lenticular or barrier lens sheet and a three-dimensional integral image aligned with the sheet, so that a user can view the three-dimensional image without any special glass or other equipment, are well known. For example, such imaging products and their construction, are described in "Three-Dimensional Imaging Techniques" by Takanori Okoshi, Academic Press, Inc., New York, 1976, as well as in the following United States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744, now abandoned. Such products use interlaced vertical image slices which are aligned with lenticules or barrier screen openings so as to be viewable when the lenticules or openings are vertically oriented with respect to a viewer's eyes.

In many cases, an individual would like to be able to view both a three-dimensional view of some subject object, and also view some motion of that or a different object. It is possible to provide multiple three-dimensional images in some of the above type products, which could provide the illusion of motion. However, such an arrangement suffers from the disadvantage that only a very limited number of motion views will be possible whether or not the views were three-dimensional. This is so since any given view must take up a large proportion of the space under a lenticule or barrier opening so as to yield a viewing angle of that view which, at the intended viewing distance, is wider than the distance between a user's eyes. Otherwise, the user would see different views through different eyes. U.S. Pat. No. 3,268,238 and U.S. Pat. No. 3,538,632 describe image devices using lenticular lens sheets with multiple images thereunder so as to create the illusion of motion when the viewing angle of the device is altered. However, neither of those patents suggest how one might obtain a device which provides both three-dimensional views and motion.

It would be desirable then to provide a single viewing product, which can provide both a three-dimensional view of a scene and which same product can also provide a large number of relatively high-resolution two-dimensional views of a scene. It would also be desirable if the two-dimensional views could represent motion of an object in them.

SUMMARY OF THE INVENTION

The present invention then, provides in one aspect, a dual-view imaging product having an integral lens sheet and at least two different integral images both aligned with the integral lens sheet. Each integral image has a normal viewing orientation, such that one is viewable in its normal orientation when the lens sheet is positioned horizontally with respect to the user's eyes, and the other is viewable in its normal orientation when the lens sheet is positioned vertically with respect to the user's eyes. The integral lens sheet could be a fly's eye lens sheet but is more preferably a lenticular lens sheet. By an "integral" image is referenced an image composed of segments (lines, in the case of a lenticular lens sheet) from at least one complete image, which segments are aligned with respective individual lenses so that the entire image is viewable when a user's eyes are at the correct angle relative to the imaging product. It will be appreciated that a barrier sheet (which comprises a sheet with many closely spaced, fine linear openings) could be used instead of a lenticular lens sheet. However, barrier sheets are less preferred due to loss of light inherent in their use.

In another aspect of the present invention, a dual-view imaging product has a lenticular or barrier lens. A three-dimensional image is aligned with the lens and having at least one depth feature viewable when the lenticules or barrier openings are positioned vertically with respect to a user's eyes. One or more two-dimensional images is also aligned with the lens so as to be viewable when the lenticules or barrier openings are positioned horizontally with respect to the user's eyes, the two-dimensional images not being part of the three-dimensional image.

In this application, by a "three-dimensional image", is meant an integral image which, when viewed through the lens, has a visible depth element. A depth element means the ability to at least partially look around an object in the scene. This can be obtained by interlacing lines from different perspective views of the same scene. Thus, a three-dimensional image necessarily includes at least two views of a scene. By a two-dimensional image is referenced an image which, when viewed in the product, does not have any viewable depth element. A "two-dimensional image" though, is not one of the views of a three-dimensional image. The three-dimensional and two-dimensional images required by the invention may contain some scene elements in common though (that is, they have the same scene content in only a portion of both images). An example of this is where both have the same border. More typically though, they will not have any common scene elements. By a scene element in this regard, is referenced the same view of the same object (which includes the object appearing to be the same size).

When a plurality of two-dimensional images are present, they may represent a single scene at least a part of which is in motion. Alternatively, the two-dimensional images may be unrelated in scene content. Optionally, the product of the present invention could include additional three-dimensional images each of which is viewable when the lenticules or barrier openings are positioned vertically with respect to a user's eyes.

The present invention then, provides in a single product, the ability to view both a three-dimensional view of a scene and also to view a large number of relatively high-resolution two-dimensional views of a scene. Additionally, the product allows the two-dimensional views to readily display motion.

DRAWINGS

Embodiments of the invention will be described in detail below, with reference to the drawings in which.

EMBODIMENTS OF THE INVENTION

Figure 1:
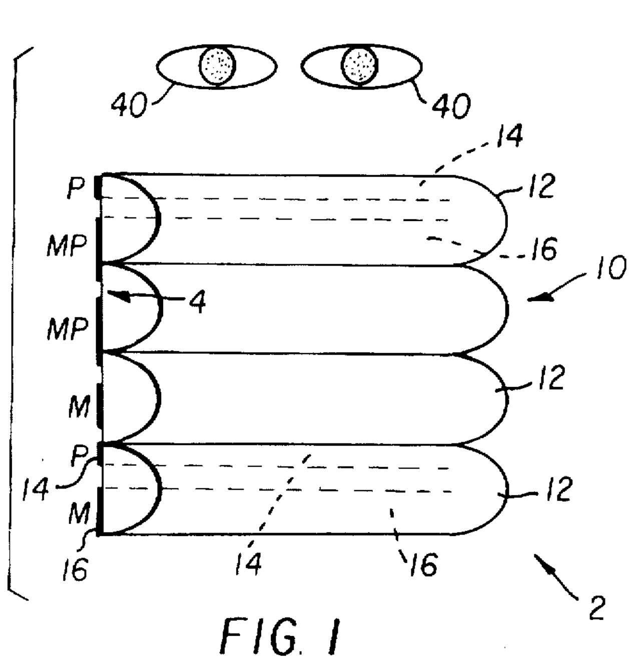
FIG. 1 is a front perspective view of a dual-view imaging product of the present invention showing it in a horizontal orientation for viewing of multiple two-dimensional images in it.

Referring to FIG. 1, the dual view-imaging product shown is generally represented by numeral 2. Product 2 includes a lenticular lens sheet 10 which has a plurality of parallel, adjacent lenticules 12. A flat side 4 of sheet 10 carries a plurality of image areas 14 and 16. Each of image areas 14 is made up of a series of individual lines from a number of images, all of which are aligned with respective lenticules 12. In particular, in the embodiment shown, image area 14 contains eight image lines P1 to P8. Each of these represents a line of an image, which image was taken from a corresponding perspective position.

Thus, P1–P8 represent respective lines from eight perspective images. In this regard, "perspective" images refers to the images being taken at different horizontal positions (preferably on the same horizontal plane) with respect to a scene. Lines P1–P8 represent vertical lines (that is, narrow slices) with reference to the normal orientation of a scene. For example, for a scene reproduced in FIG. 5 the normal orientation is with the tree 24 and doghouse 26 oriented as illustrated. For the scene in FIG. 5 then, lines P1–P8 represent vertical slices (as viewed in FIG. 5) of that scene. The next image area 14 would contain the next vertical slice from each of the eight images until each lenticule has an image area 14.

Figure 4A:
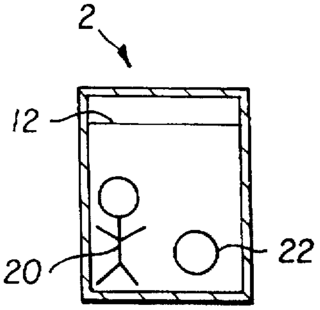
FIGS. 4–4C illustrate a dual-view imaging product of the type shown in FIGS. 1–3, oriented in a vertical direction to display a series of motion containing two-dimensional images.
Figure 4B:
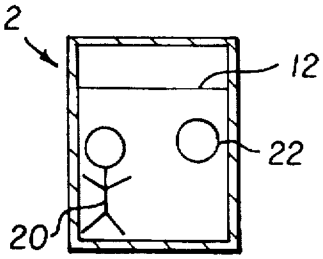
Figure 4C:
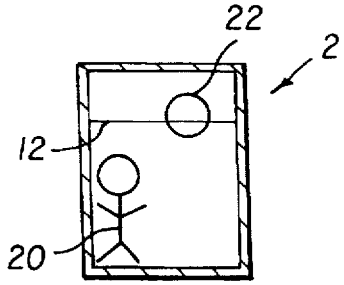

On the other hand, image area 16 has twelve lines M1 to M12 taken from individual images of a scene, at least part of which is in motion. Three such scenes are illustrated in FIGS. 4A to 4C where the person 20 is stationary but the ball 22 is in motion. The scenes in FIGS. 4–4C are shown oriented in their normal viewing orientation (that is, with the person 20 in a featureless background, oriented upward. The lines M1 to M12 are horizontal slices from each of twelve corresponding images. For example, line M2 could be a first horizontal slice from FIG. 4A while lines M2 and M3 are first horizontal slices from FIGS. 4B and 4C, respectively. Similarly, lines M4 to M12 could be first horizontal slices from another series of images either continuing the motion shown in FIGS. 4A to 4C, or having a scene content unrelated to that of FIGS. 4A to 4C. By "horizontal" in this regard, is meant the horizontal direction as viewed in FIGS. 4A to 4C.

Figure 5:
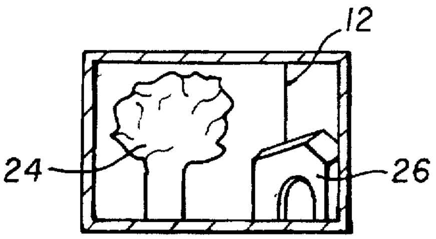
FIG. 5 illustrates the same imaging product of FIGS. 4A–4C oriented in a horizontal direction to display a three-dimensional image.

It will be noted that the each of the two-dimensional images of FIGS. 4–4C are not part of the three-dimensional image of FIG. 5 in the sense that it is not one of the eight views from which the three-dimensional image of FIG. 5 is composed. Also, while there is no scene content the same in the set of images of FIGS. 4–4C and 5, it is possible that there could be some (but not all) common scene content. For example, bouncing ball 22 might appear as a three-dimensional object in FIG. 5.

Figure 2:
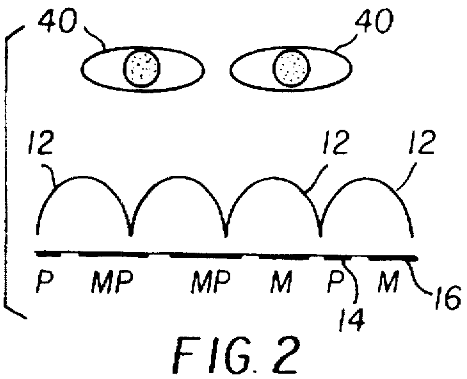
FIG. 2 is a top plan view of the imaging product of FIG. 1 showing it in the vertical orientation for viewing of three-dimensional images in it.
Figure 3:
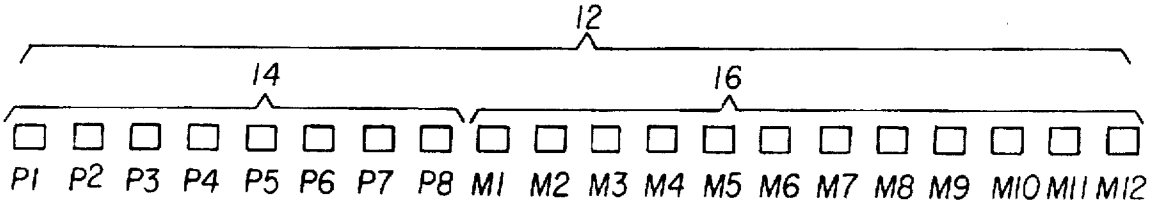
FIG. 3 is a cross-section through a single lenticule and aligned image lines of the dual-view imaging product of FIGS. 1 and 1.

When a user wishes to view the three-dimensional image of product 2, as shown in FIG. 5, he can orient product 2 such that lenticules 12 are vertically positioned (that is, each intersects a plane of sight on which both eyes lie) as shown in FIG. 2. When product 2 is held vertical and tilted at varying angles sideways, each perspective view making up the three-dimensional image shown in FIG. 5, will be visible. This will give the illusion of being able to look around the tree 24 and doghouse 26. To view the series of motion images, such as those of FIGS. 4–4C, product 2 can then be rotated 90° such that the lenticules 12 are then horizontal as shown in FIG. 1 (the plane of sight of a viewer's eyes 40 being parallel to the lenticules). With the positioning of areas 16 as shown in FIG. 1, the eyes will be looking slightly downward to view the images of FIG. 4–4C. Each of the twelve images can be viewed in turn by pivoting product 2 back and forth (that is, so that the plane in which it lies, moves through an angle with respect to the viewing plane on which viewer's eyes 40 lie).

The image lines in areas 14 and 16 can be provided on flat side 4 of sheet 10 in any known manner. For example, they could be printed directly flat side 4 using ink printers, or flat side 4 could have a photosensitive emulsion onto which the images are exposed from a master negative (such as by contact printing). Less preferably, such a photosensitive emulsion could be present on a transparent base separate from the remainder of the product 2, which is first exposed and processed before being aligned and bonded to the remainder. Also less preferable, would be exposing each individual view through the lenticular lenses 12 in a known manner. The foregoing types of procedures are disclosed in the references cited under the "Background" section above. Those references, and all other references cited in the present application, are incorporated herein by reference.

As to the spacing of the image lines P1–P8 and M1–M12, it may be useful to include an additional gap between the perspective view P8 and the motion view M1. This provides a better distinction between motion and perspective views during viewing.

It will be appreciated, that in product 2 it is possible to provide multiple three-dimensional images. For example, the image of FIG. 5 could be composed of a stereoscopic pair of views in lines P1 and P2 under each lenticule. Other of lenticules P3–P8 could be used to provide stereoscopic pairs of views so that a total of four three-dimensional images would be present. However, this reduces the ability to look-around objects in a given three-dimensional image. Also, in order to provide high resolution views of the scene content of the motion images, it is preferred to include in a sequence of motion images, repeated images. That is, each motion image may be repeated one or more times during interlacing so that one or more repetitions of the identical image is viewed adjacent one another as product 2 is tilted to view the motion images in sequence. Of course, this will decrease the number of actual motion images (that is, in which some scene content is in motion from one to the other) which can be accommodated under each of the lenticules 12. Such an arrangement is described in U.S. patent application Ser. No. 08/430,076 entitled "DEVICE AND METHOD FOR PRODUCING LENTICULAR IMAGES WITH MOTION" filed by S. Gulick on Apr. 27, 1995 allowed.

Figure 6:
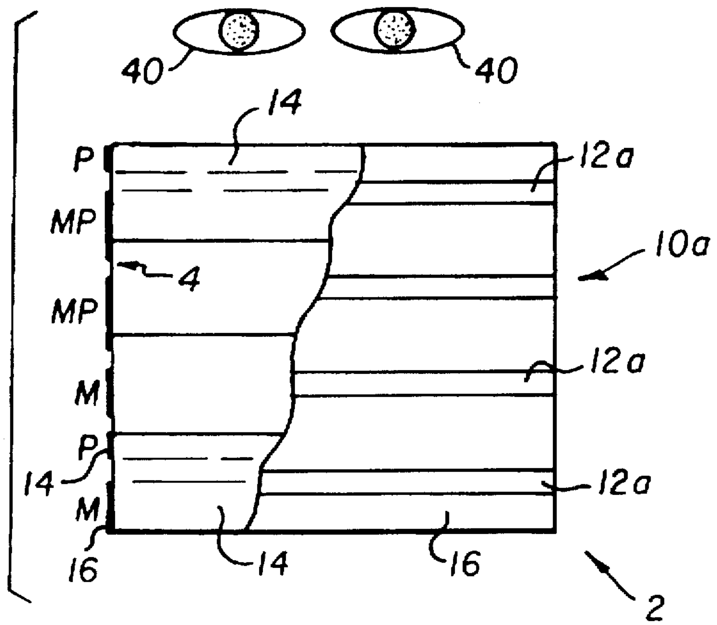
FIGS. 6 and 7 are the same as FIGS. 1 and 2, respectively, except showing a barrier sheet in place of a lenticular sheet (FIG. 6 showing the barrier sheet being partially cut away).
Figure 7:
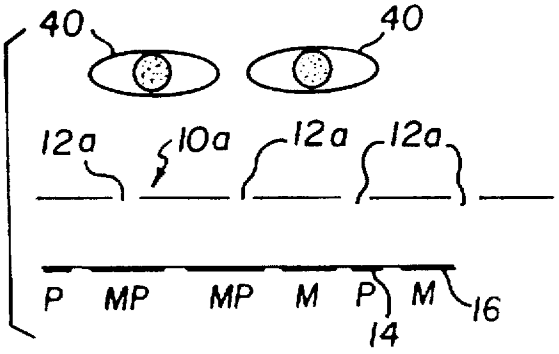

FIGS. 6 and 7 show a barrier sheet 10a used instead of the lenticular lenses. Barrier sheet 10a has a series of parallel openings 12a. FIGS. 6 & 7 show a barrier sheet 10a used instead of the lenticular lenses. Barrier sheet 10a has a series of parallel openings 12a. In FIG. 6 the barrier sheet 10a overlaying a sheet of photographic or print material 11a. The underlying sheet 11a is comprised of alternating data from 2 different images. This alternating data is defined as coming from an image that is represented by P and an image represented by M. This data M and P are combined together in an orientation and resolution such that when a viewer looks at the overall barrier image through openings 12a he will see the data underneath 11a in a special way that has been chosen to produce a desired effect. When a viewer looks through the barrier sheet 10a, as in FIG. 6, both eyes 40 are on the same plane and will have the same perspective view through each of the parallel opens 12a. From one viewer's perspective he will see the image defined by the data P and from another viewpoint, noting that the viewer had to move vertically to a different position or tilt the image vertically, he will then see the other image defined in 11a which will be M. In FIG. 7, we see a viewer's eyes represented as 40 looking at a barrier image viewing it through the barrier sheet 10a having parallel openings 12a on to the image data plane 11a. From the perspective of the viewer 40, each eye has a different perspective view of the overall barrier image. The left eye may end up seeing the image defined by P and the right eye may see the image defined by M. If the data or image defined by M and P represent the left and right views of a stereo pair, the user will see the image in three dimensions. As the viewer moves to a different position he will see different data.

The preceding examples are set forth to illustrate specific embodiments of this invention and are not intended to limit the scope of the invention. It will be understood that variations and modifications can be effected within the spirit and scope of the invention.

Parts list p0 P1–P8 and m1–m12 Image Lines

2 Product
4 Flat Side
10 Sheet
10a Barrier Sheet
12 Lenticules
12a *Parallel Openings*
14 and 16 Image Areas
20 Person
22 Ball
24 Tree
26 Doghouse
40 Viewer's Eyes

I claim:

1. A dual-view imaging product, comprising:

a lenticular lens sheet;

a three-dimensional image having a normal viewing orientation, aligned with the lens so as to be viewable in its normal viewing direction when the lenticules of the lenticular lens sheet are positioned vertically with respect to a user's eyes: and a two-dimensional image which is not part of any three-dimensional image and which has a normal viewing direction, aligned with the lens and viewable in its normal orientation when the lenticules are positioned horizontally with respect to a user's eyes.

2. A dual-view imaging product according to claim 1 comprising a plurality of two-dimensional images which are not part of the three-dimensional image, the images being aligned with the lenticules and viewable when the lenticules are positioned horizontally with respect to the user's eyes.

3. A dual-view imaging product according to claim 1 wherein the plurality of two-dimensional images represent a single scene at least a part of which is in motion.

4. A dual-view imaging product according to claim 1 wherein the plurality of two-dimensional images are unrelated in scene content.

5. A dual-view imaging product according to claim 1 comprising a plurality of three-dimensional images each of which is viewable when the lenticules are positioned vertically with respect to a user's eyes.

6. A dual-view imaging product according to claim 1 wherein the three-dimensional image and the two-dimensional image are unrelated in scene content.

7. A dual-view imaging product according to claim 1 wherein the three-dimensional image and the two-dimensional image have the same scene content in only a portion of both images.

8. A dual-view imaging product, comprising:

a lenticular lens sheet;

a three-dimensional image aligned with the lenticules of the lenticular lens sheet and having at least one depth feature viewable when the lenticules are positioned vertically with respect to a user's eyes: and a plurality of two-dimensional images which are not part of the three-dimensional image, the images being aligned with the lenticules and viewable when the lenticules are positioned horizontally with respect to the user's eyes.

9. A dual-view imaging product according to claim 8 wherein the plurality of two-dimensional images represent a single scene at least a part of which is in motion.

10. A dual-view imaging product according to claim 8 wherein the plurality of two-dimensional images are unrelated in scene content.

11. A dual-view imaging product, comprising:

a lenticular lens sheet;

a plurality of three-dimensional images aligned with the lenticules of the lenticular lens sheet which images are viewable when the lenticules are positioned vertically with respect to a user's eyes; and a two-dimensional image aligned with the lenticules and viewable when the lenticules are positioned horizontally with respect to the user's eyes, the two-dimensional image not being part of the three-dimensional image.

12. A dual-view imaging product according to claim 11 wherein the three-dimensional images and the two-dimensional image are unrelated in scene content.

13. A dual-view imaging product according to claim 11 wherein the three-dimensional images and the two-dimensional image have the same scene content in only a portion of both images.

14. A dual-view imaging product according to claim 13 wherein the same scene content in only a portion of both images is a border adjacent to the outside of the images.

15. A dual-view imaging product, comprising:

a barrier sheet having openings therein;

a three-dimensional images aligned with the barrier openings which images are viewable when the barrier openings are positioned vertically with respect to a user's eyes; and a two-dimensional image aligned with the barrier openings and viewable when the barrier openings are positioned horizontally with respect to the user's eyes, the two-dimensional image not being part of the three-dimensional image.

16. A dual-view imaging product, comprising:

a barrier sheet having openings therein;

a three-dimensional image aligned with the barrier openings and having at least one depth feature viewable when the barrier openings are positioned vertically with respect to a user's eyes: and a plurality of two-dimensional images which are not part of the three-dimensional image, the images being aligned with the barrier openings and viewable when the barrier openings are positioned horizontally with respect to the user's eyes.

* * * * *